United States Patent [19]

Humphrey et al.

[11] Patent Number: 4,898,921

[45] Date of Patent: Feb. 6, 1990

[54] CONDUCTING POLYMER FILMS, METHOD OF MANUFACTURE AND APPLICATIONS THEREFOR

[75] Inventors: Brian D. Humphrey, Cedar Grove; Marc L. Kasner, Kinnelon; John L. Isidor, Upper Montclair, all of N.J.

[73] Assignee: Montclair State College, Montclair, N.J.

[21] Appl. No.: 57,602

[22] Filed: Jun. 3, 1987

[51] Int. Cl.⁴ .................... C08G 81/00; C08G 83/00
[52] U.S. Cl. .................... 527/300; 527/200; 527/312; 527/315; 252/582
[58] Field of Search .......... 527/200, 300, 312, 315; 252/582

[56] References Cited

U.S. PATENT DOCUMENTS

| | | | |
|---|---|---|---|
| 3,420,788 | 1/1969 | Solms | 527/300 |
| 4,605,721 | 8/1986 | Jenkins et al. | 527/312 |
| 4,663,163 | 5/1987 | Hou et al. | 527/315 |
| 4,690,749 | 9/1987 | Van Alstine et al. | 428/403 |
| 4,705,825 | 11/1987 | Symes et al. | 527/312 |

FOREIGN PATENT DOCUMENTS

| | | |
|---|---|---|
| 144127 | 6/1985 | . |
| 180082 | 5/1986 | . |
| 206414 | 12/1986 | . |
| 3321281 | 12/1983 | Fed. Rep. of Germany . |
| 3510036 | 9/1986 | Fed. Rep. of Germany . |
| 2575586 | 7/1986 | France . |
| 43-26101 | 11/1968 | Japan .................... 527/315 |
| 61-138625 | 6/1986 | Japan . |
| 62-296375 | 12/1987 | Japan . |
| 63-8973 | 4/1988 | Japan . |
| 63-98972 | 4/1988 | Japan . |
| 63-102162 | 5/1988 | Japan . |

*Primary Examiner*—Ronald W. Griffin
*Attorney, Agent, or Firm*—Klauber & Jackson

[57] ABSTRACT

Conducting polymer films comprising a polymer matrix with intercalated, bonded conducting polymers, prepared from a polysaccharide matrix and the monomer of conducting polymer, are useful as anti-static materials, optical filters, solid electrolytes, electrodes and electrochemical sensors. The conducting polymers are polyheterocycles such as polyaniline, polythiophene and their derivatives.

30 Claims, No Drawings

CONDUCTING POLYMER FILMS, METHOD OF MANUFACTURE AND APPLICATIONS THEREFOR

BACKGROUND OF THE INVENTION

Since their discovery, conducting organic polymers have been of interest from both a theoretical and technological point of view. Research involving conducting polymers has shown promise of significant breakthrough in several areas including energy storage devices, electrochromic displays, corrosion prevention, and molecular electronic devices. In recent years, conducting polymers have been used as electrocatalytic structures, drug delivery systems and ion gates. This has opened up the potential for numerous new applications in biochemical technology such as the incorporation of biomolecules in a conducting polymer matrix or the development of sensors which combine the specificity of a biological reaction with the sensitivity of an electrochemical technique.

Known conducting polymers include polyheterocycles, such as polypyrrole, polythiophene, polyaniline and their derivatives. These particular materials have attracted special attention due to their characteristics of stability in the presence of oxygen and water. Unfortunately, these materials suffer from poor mechanical properties such as brittleness at high conductivities which have greatly limited their use in practical applications.

Numerous attempts have been made to improve the mechanical properties of these conducting polymers so as to adapt them to various utilities. These attempts include polymerization on a substrate material, copolymerization processes and the synthesis of new monomers While these processes have resulted in useful data, they have failed for various reasons to provide a commercially viable product having the necessary characteristics.

SUMMARY OF THE INVENTION

In accordance with the present invention, conducting polymer films comprising a polysaccharide matrix with intercalated, bonding conducting polymers have been prepared. The polymer films advantageously retain many of the mechanical properties of the polysaccharide matrix while also exhibiting the spectral and electronic characteristics of the conducting polymer. These films are comprised of a polymer matrix with intercalated, bonded conducting polymers selected from the group consisting of polyheterocycles such as polypyrrole, polythiophene, polyaniline and their derivatives.

Correspondingly, the present invention relates to the synthesis of these novel conducting polymer films by the oxidation of a mixture containing the polysaccharide matrix material, the particular monomer of the desired conducting polymer and an electrolyte.

The present invention also relates to various methods of utilizing the conducting polymer films thusly formed. More particularly, the utility for which a given conducting polymer film is suitable is based upon the characteristics of the chosen polysaccharide matrix and the chosen conducting polymer. Given the various permutations and combinations of suitable polysaccharide matrices and conducting polymers, a wide range of applications is available.

Accordingly, it is a principal object of the present invention to provide conducting polymer films having the desired mechanical properties which are physically and chemically stable.

It is a further object of the present invention to provide processes for the preparation of these conducting polymer films.

It is a still further object of the present invention to provide methods of use for these conducting polymer films.

Other objects and advantages will become apparent to those skilled in the art from a review of the ensuing description.

DETAILED DESCRIPTION OF THE INVENTION

In its primary aspect, the present invention concerns conducting polymer films comprising a polysaccharide matrix with intercalated, bonded conducting polymers selected from the group consisting of polyheterocycles such as polypyrrole, polythiophene and polyaniline and their derivatives.

The choice of a polysaccharide matrix for the conducting polymer film of the present invention depends in part upon the characteristics desired in the final product. Numerous such polysacharide matrices are commercially available. Among those which can be used in the present invention are cellulose, amylose, amylopectin, cellulose esters such as cellulose acetate, cellulose ethers, algenic acid, agar, glycerin cross-linked dextran polymers sold under the trademark Sephadex ®, heparin, agarose, chondroitin, chondroitin sulfates, and nitrocellulose. The polysaccharides can be utilized in either neutral or salt forms. Any other structurally stable polysaccharide matrix can also be utilized as lone as it is able to withstand exposure to air and aqueous media. Since the resultant conducting polymer film will retain much of the mechanical properties of the chosen polysaccharide matrix, the choice of polysaccharide matrix depends upon the desired end use of the conducting polymer film. For instance, where the desired product is for use as an anti-static protective covering, a cellulose membrane such as dialysis membrane is a particularly suitable polysaccharide matrix for use in the process of the present invention to produce a product with the desired flexibility.

The conducting polymer chosen for use in the present invention is likewise dependent upon the characteristics desired in the final product. Typical conducting polymers are the polyheterocycles selected from the group consisting of polypyrrole, polythiophene and polyaniline and their derivatives.

The most widely investigated air-stable conducting polymer is polypyrrole which is typically formed electrochemically and chemically by an oxidation-initiated cationic polymerization. For this reason, it is a conducting polymer of choice in the present invention. Additionally, many derivatives of the monomer pyrrole are commercially available and the different substituent groups on the pyrrole ring have been shown to change both the structure and properties of the conducting polymer film formed. In certain cases, the presence of a substituent on the monomer will result in a "hole" in the matrix of the resultant conducting polymer film. This "hole" or "pocket" will enable one to further "trap" or incorporate other biomolecules, expanding the use of the resultant conducting film polymer. The presence of a substituent on the pyrrole monomer may likewise change the conductivity of the resultant conducting film polymer. Thus, one could change the conductivity of the resultant conducting film polymer without substantially modifying the other superstructure characteristics.

The other various polyheterocycles utilizable in the present invention are similarly amenable to manipulation to afford conducting polymer films having the desired characteristics. Thus the monomers of polyaniline and polythiophene, aniline and thiophene, are both commercially available in their unsubstituted and substituted forms. Polymerization of these monomers likewise occurs in a manner conducive to use in the instant process, i.e., under oxidative conditions, polymerization occurs.

The process of the present invention is the process for preparing a conducting polymer film comprising a polysaccharide matrix with intercalated, bonded conducting polymers selected from the group consisting of polyheterocycles such as polypyrrole, polythiophene, polyaniline and their derivatives which comprises:

(a) mixing or suspending the polysaccharide matrix material with a solution of the monomer of the desired conducting polymer in an appropriate electrolyte salt;

(b) treating the reaction mixture of (a) with a solution of an oxidizing agent; and (c) removing the resultant product formed by step (b) from the reaction solution.

Typically, the polysaccharide matrix is suspended in a solution of the monomer in an aqueous solution of an appropriate electrolyte salt. The electrolyte salt chosen is a matter of choice dependent upon the particular monomer being utilized. Typically, aqueous sodium chloride or potassium chloride is utilized when pyrrole, or thiophene or a derivative thereof is the monomer of choice. When aniline or a derivative thereof is the monomer of choice, 0.5-2.0M hydrochloric acid can be utilized as the electrolyte salt. Additionally, non-aqueous solvents, such as acetonitrile, dimethylsulfoxide and dimethylformamide, and mixtures of such non-aqueous solvents and water can be utilized in place of the aqueous solution. When non-aqueous solvents are utilized the electrolyte is typically a salt soluble in the particular solvent such as lithium perchlorate.

The oxidizing agent chosen for use in the preparation of the conducting polymer film of this invention is, of course, dependent upon the particular monomer chosen. The only requirement is that the oxidizing agent be capable of initiating the polymerization of the monomer chosen to the desired conducting polymer. Typical oxidizing agents suitable for use are those such as ammonium persulfate (peroxydisulfate), potassium permanganate, and potassium dichromate. Of these, ammonium persulfate is particularly suitable for use with both the aniline and pyrrole monomers. In some instances, it will be advantageous to add a portion of the oxidizing solution to the polysaccharide matrix prior to its mixing with the monomer.

The reaction times for the process of the particular invention varies depending upon the particular monomer being utilized, and the oxidizing agent and electrolytes being used and their respective concentrations. Typically, the polymerization is completed within a few minutes, and is usually visually noticeable by a rapid color change in the reaction mixture.

Other factors which may determine the characteristics of the resultant conducting polymer film are the concentrations of the various reactants, and the pH at which the reaction is conducted. These will be matters of choice depending upon the reactants chosen.

Upon completion of the polymerization initiated by the oxidizing agent, the resultant conducting polymer film is removed from the reaction mixture by physical means. Then, the product is usually washed with excess electrolyte salt solution and dried to afford the desired conducting polymer film.

Numerous test procedures have established that the product produced by the process of the present invention, i.e., the conducting polymer film, is a chemically stable polymer. Thus, the conducting polymer on the conducting polymer film is not a surface coating on the polysaccharide matrix that could be removed by physical or chemical means. This characteristic distinguishes the conducting polymer films of this invention from that of the prior art. Heretofore, a chemically or physically stable conducting polymer film had not been produced. The prior art methods of polymerization on a substrate produced a conducting polymer which could, by physical or chemical means, be separated from the substrate onto which it had been precipitated. Such is not the case with the product and process of the instant invention.

Tribulation for long periods of time in polar and nonpolar solvents will not leach out any of the colored materials nor the conducting polymer film. Reaction between a given solvent and the polysaccharide matrix may destroy the polysaccharide but leaves behind residue of conducting polymer. Treatment of the conducting polymer film wish strong acids and bases will, in some cases dissolve the polysaccharide matrix but will, likewise not dissolve the conducting polymer nor separate the conducting polymer film.

A typical set of standard tests run on reconstituted cellulose membrane (dialysis membrane) consisted of soaking the solvents such as methanol, ethanol, dichloromethane, dimethylsulfoxide, etc. After periods of time ranging up to several days, there was no significant change in the physical characteristics of the conducting polymer film. Treatment with concentrated sulfuric acid, concentrated nitric acid, glacial acetic acid, and 10M sodium hydroxide solution had deleterious effect on the flexibility of the conducting polymer film. However, in no case was the conducting polymer film separable into its constituent parts.

A similar series of tests on agarose gels showed that the gel structure could be destroyed and the conducting polymer could be recovered. Again, in no case could both the intact polysaccharide matrix and the conducting polymer be separated.

It should be noted that polyaniline is soluble in 80% acetic acid and fractions of polyaniline are soluble in specific organic solvents (as detailed in the literature). However, polyaniline cannot be leached out of the conducting film polymer formed from aniline and cellulose in these solvents.

The ultraviolet-visible spectrum of the resultant conducting polymer films indicate that the ultravioet-visible spectrum correspond to that of the polymer of the monomer utilized in the process. Thus, the ultraviolet-visible spectra of the conducting polymer film formed from cellulose and pyrrole in aqueous media shows the same characteristics as polypyrrole, i.e., essentially a constant extinction coefficient independent of wave length from 900-250 nm.

Similarly, the conducting polymer film formed from cellulose and aniline exhibit the spectral characteristic of polyaniline. The spectral characteristics of the conducting polymer film formed from cellulose and aniline respond to pH and redox changes in precisely the same fashion as does pure polyaniline. Since the original cellulose matrix is transparent over this wave length range, these studies indicate that the conducting polymer film from the process of the present invention does contain polyaniline structures.

When the conducting polymer film formed from the various polyheterocycles and cellulose are subjected to infra-red light, they exhibit the infrared spectral characteristics of cellulose.

The electrical conductance of the resultant conducting polymer film will depend upon the particular conducting polymer chosen. The polysacchride matrices are generally non-conducting materials. The maximum conductivity of non-aqueous prepared polypyrrole is about 100 S/cm. The maximum conductivity of aqueous prepared polyaniline is about 5 S/cm. (S = Siemems = ohm$^{-1}$).

The utilities to which the conducting polymer films of the present invention can be put are numerous. While the listed utilities are believed to be representative, they can in no way be considered exhaustive.

The conducting polymer films can be utilized as anti-static packaging material and anti-static protective covering. The conducting polymer films utilizing a polysaccharide matrix of cellulose are especially useful in this application due to the inexpense of the cellulose.

Another utility for which the conducting polymer films are useful is that of optical filters. Since it is possible to prepare films with transmittances from almost 100% down to less than 10%, such films can be used to prepare true color optical filters.

A further utility for the conducting polymer films of this invention will be in the fabrication of solid electrolytes and electrodes. Since electrical conduction through a stable, solid flexible material would be preferred, the conducting polymer films can be used to prepare items such as batteries, electrochromic displays, flexible non-corroding conductors and electrochemical sensors.

Certain polysaccharide matrix materials such as agarose are castable and thus impart this property to their resultant conducting polymer films. These castable conducting polymer films can be heated to melting, poured on suitable surfaces, allowed to cool and freed from the surface to yield free-standing flexible films.

Yet another utility for the conducting polymer films of the present invention involves such films as prepared with "holes" or "cavities" in the molecular superstructure. These "holes" or "cavities" can then be utilized to "trap" biomolecules within the conducting polymer film. For instance, a conducting polymer could be used to trap an enzyme such as glucose oxidase. The resultant product could then be utilized as an amperometric sensor for the detection of glucose.

The following examples in detail products illustrative of the present invention and processes for the preparation thereof. It will be apparent to those skilled in the art that many modifications, both of materials and methods, can be made without departing from the spirit and scope of the invention.

EXAMPLE 1

Formation of Polypyrrole and Cellulose Conducting Polymer Film

A polysaccharide matrix, cellulose dialysis membrane, is suspended in a solution prepared by dissolving approximately 5.4 ml of pyrrole in 200 ml of 0.10M NaCl. The duration of the suspension (from seconds to days) and the temperature of the solution (from 0° to 20° C.) do not signficantly affect the subsequent formation of the conducting polymer film. The oxidizing solution is prepared by dissolving 4.6 9 of ammonium persulfate [$(NH_4)_2S_2O_8$)] in 200 ml of 0.10M NaCl. The oxidizing solution is then added to the solution containing the monomer and the matrix. Over a period of several seconds (less than 1 minute), the solution changes color from clear to aqua to black. At this time the matrix is removed and washed with copious quantities of 0.10M NaCl. The wash process removes excess conducting polymer from the conducting polymer film. Loosely adhering polypyrrole and electrolyte are further removed by gently wiping the conducting polymer film. The resulting material is allowed to air dry. Conductivity is measured and found to be 0.1 to 1 S/cm.

EXAMPLE 2

Formation of Polyaniline and Cellulose Conducting Polymer Film

A polysaccharide matrix, cellulose dialysis membrane, is suspended in a solution prepared by dissolving approximately 20 ml of aniline in 300 ml of 1.0M HCl. The duration of the suspension (from seconds to 12 hours) and the temperature of the solution (from 0° to 20° C.) do not significantly affect the subsequent formation of the conducting polymer film. The oxidizing solution is prepared by dissolving 11.5 g of ammonium persulfate (($NH_4)_2S_2O_8$) in 200 ml of 1.0M HCl. The oxidizing solution is then added to the solution containing the monomer and the matrix. Over a period of several seconds (less than 1 minute), the solution changes color from clear to aqua to green. At this time the cellulose matrix is removed and washed with copious quantities of 1.0M HCl. The wash process removes excess conducting polymer from the conducting polymer film. Loosely adhering polyaniline and electrolyte are further removed by gently wiping he film. The resulting material is allowed to dry. the conductivity is measured and found to be 0.1 to 1 S/cm. The stability of this material can be increased by exposure to base.

EXAMPLE 3

Formation of a Polypyrrole and Cellulose Conducting Polymer Film

The procedure of Example 1 is repeated utilizing 1M HCl as the electrolyte in place of the sodium chloride. The resulting conducting polymer film as similar to that of Example 1 and had a conductivity of about 1 S/cm.

EXAMPLE 4

Formation of a Polypyrrole and Agarose Conducting Polymer Film

A 0.1M ammonium persulfate solution is prepared by dissolving 4.56 9 ammonium persulfate in 200 ml 0.1M NaCl.

A 10% agarose gel is prepared by dissolving 1 g agarose in 50 ml of a 0.1M ammonium persulfate solution. The mixture is heated, with stirring, until dissolution is completed. Cool to room temperature.

A 0.4M pyrrole solution is prepared by diluting 5.36 ml pyrrole with 200 ml 0.1M NaCl. 50 ml of this solution is then added to the agarose solution. The resultant solution is heated and then filtered to remove solid pieces of polypyrrole that have been formed. To 50 ml of this solution is then added a further 1.0 g agarose in 50 ml water. Cooling results in a brown gel having good conductivity. The hardened gel can be reheated to a liquid state for pouring and molding.

EXAMPLE 5

Formation of a Polyaniline and Agarose Conducting Polymer Film

A solution of aniline monomer is prepared by dissolving 3.32 ml of aniline in 50 ml 1M HCl.

An oxidizing solution if prepared by dissolving 2.007 g ammonium persulfate in 50 ml 1M HCl.

One gram agarose is dissolved with heat and stirred in the oxidizing solution.

An agarose gel is prepared from dissolution of agarose in 50 ml water with heat and stirring.

The addition of the aniline monomer solution to the oxidizing agarose solution causes a color change. The solids are filtered, and 50 ml of the filtered solution is added to 50 ml of the agarose gel in water solution. Cooling results in a green gel.

EXAMPLE 6

Formation of Polypyrrole and Cellulose Conducting Polymer Film

The procedure of Example 1 is repeated utilizing 99% acetonitrile as the solvent in place of water and 0.1M lithium perchlorate ($LiClO_4$) as the electrolyte in place of 0.1M NaCl. The oxidizing solution is prepared as a saturated solution of ammoniumpersulfate in 0.10M $LiClO_4$ in 99% acetonitrile. The resulting polypyrrole-cellulose conducting film is found to have a conductivity measured as approximately 10–20 S/cm.

What is claimed is:

1. A conducting polymer film comprising a polysaccharide matrix with intercalated, bonded conducting polymers selected from the group consisting of polypyrrole, polythiophene, polyaniline and their derivatives.

2. A conducting polymer film according to claim 1 wherein the polysaccharide matrix is cellulose membrane.

3. A conducting polymer film according to claim 1 wherein the polysaccharide matrix is a glycerin cross-linked dextran polymer.

4. A conducting polymer film according to claim 1 wherein the polysaccharide matrix is agarose.

5. A conducting polymer film according to claim 1 wherein the polysaccharide matrix is nitrocellulose.

6. A conducting polymer film according to claim 2 wherein the intercalated, bonded conducting polymer is polypyrrole.

7. A conducting polymer film according to claim 2 wherein the intercalated, bonded conducting polymer is polythiophene.

8. A conducting polymer film according to claim 2 wherein the intercalated, bonded conducting polymer is polyaniline.

9. A conducting polymer film according to claim 2 wherein the intercalated, bonded conducting polymer is a polypyrrole derivative.

10. A conducting polymer film according to claim 2 wherein the intercalated, bonded conducting polymer is a polythiophene derivative.

11. A conducting polymer film according to claim 2 wherein the intercalated, bonded conducting polymer is a polyaniline derivative.

12. A process for preparing a conducting polymer film comprising a polysaccharide matrix with intercalated, bonded conducting polymer selected from the group consisting of polypyrrole, polythiophene, polyaniline and their derivatives which comprises:
    (a) mixing or suspending the polysaccharide matrix material with a solution of the monomer of the desired conducting polymer and an appropriate electrolyte salt;
    (b) treating the reaction mixture of (a) with a solution of an oxidizing agent; and
    (c) removing the resultant formed by step (b) from the reaction solution.

13. A process according to claim 12 wherein the agent is selected from the group consisting of ammonium persulfate, potassium permanganate or potassium dichromate.

14. A process according to claim 12 wherein the electrolyte salt utilized is sodium or potassium chloride.

15. A process according to claim 12 wherein the polysaccharide matrix is cellulose membrane.

16. A process according to claim 12 wherein the polysaccharide matrix is a glycerin cross-linked dextran polymer.

17. A process according to claim 12 wherein the polysaccharide matrix is agarose.

18. A process according to claim 12 wherein the polysaccharide matrix is nitrocellulose.

19. A process according to claim 12 wherein the intercalated conducting polymer is polypyrrole.

20. A process according to claim 12 wherein the intercalated conducting polymer is polythiophene.

21. A process according to claim 12 wherein the intercalated conducting polymer is polyaniline.

22. A process according to claim 12 wherein the intercalated conducting polymer is a polypyrrole derivative.

23. A process according to claim 12 wherein the intercalated conducting polymer is a polythiophene derivative.

24. A process according to claim 12 wherein the intercalated conducting polymer is polyaniline derivative.

25. A process according to claim 12 wherein the reaction is conducted in an aqueous solution.

26. A process according to claim 12 wherein the reaction is conducted in a non-aqueous solution.

27. A process according to claim 12 wherein the reaction is conducted in acetonitrile.

28. An anti-static film comprising the conducting polymer film of claim 1.

29. An optical filter comprising the conducting polymer film of claim 1.

30. A solid electrolyte or electrode or electrochemical sensor comprising the conducting polymer film of claim 1.

* * * * *